Feb. 26, 1952 F. J. JENNY ET AL Re. 23,463
PROCESS OF PRODUCING OXYGEN
Original Filed Dec. 5, 1945
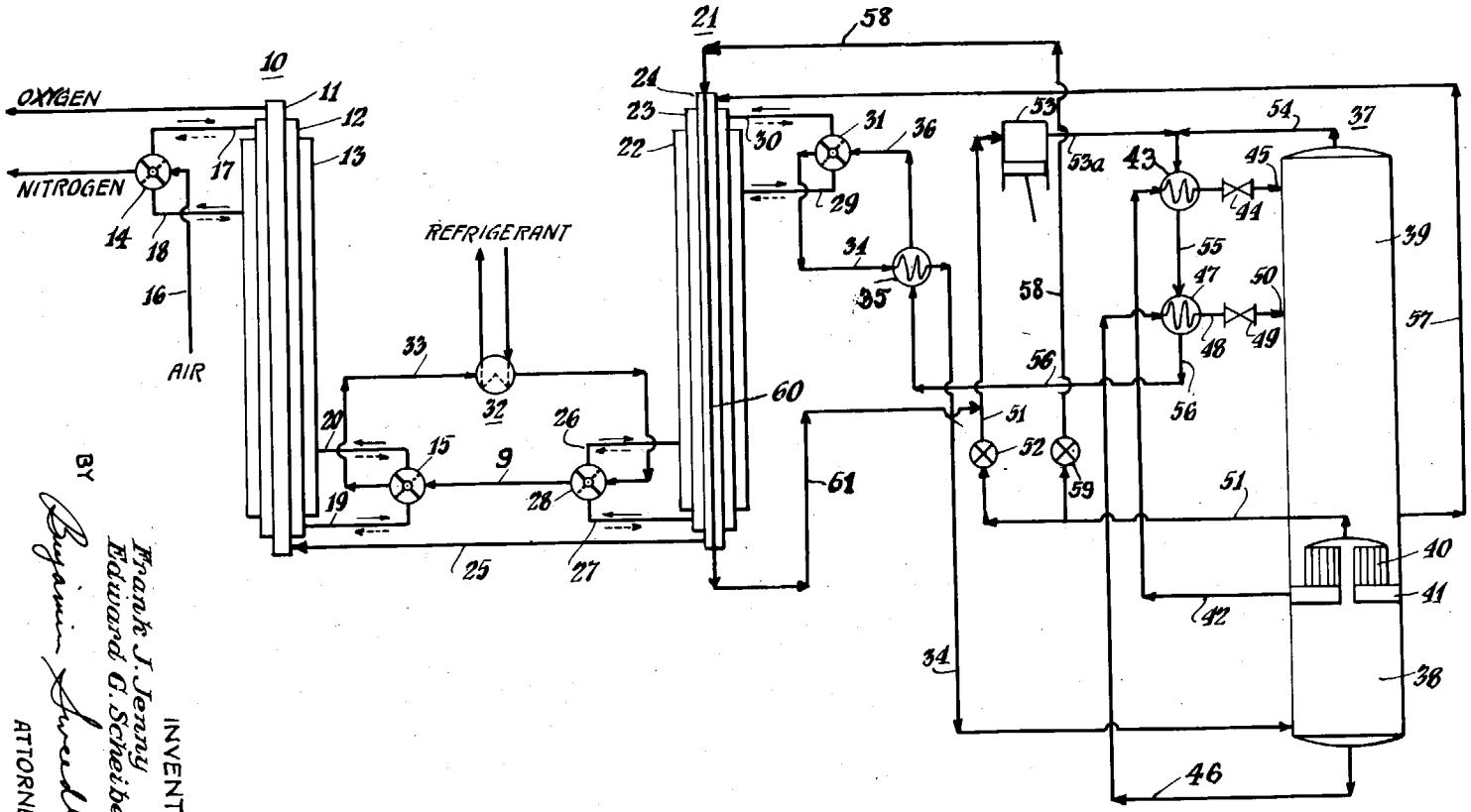
INVENTORS
Frank J. Jenny
Edward G. Scheibel
BY Benjamin Sweedler
ATTORNEY Reissued Feb. 26, 1952 Re. 23,463

UNITED STATES PATENT OFFICE 23,463

PROCESS OF PRODUCING OXYGEN

Frank J. Jenny, New York, N. Y., and Edward G. Scheibel, Montclair, N. J., assignors to Hydrocarbon Research, Inc., New York, N. Y.

Original No. 2,552,558, dated May 15, 1951, Serial No. 632,859, December 5, 1945. Application for reissue August 3, 1951, Serial No. 240,256

13 Claims. (Cl. 62—175.5)

Matter enclosed in heavy brackets [ ] appears in the original patent but forms no part of this reissue specification; matter printed in italics indicates the additions made by reissue.

This invention relates to the production of oxygen by the liquefaction and rectification of air, and more particularly to the operation of the usual two-stage rectification column and associated heat exchangers.

All temperatures herein given are in degrees F. and pressures are in pounds per square inch gauge.

Oxygen is commonly produced by partial liquefaction of air and rectification at low temperatures; preferably rectification is conducted in two stages at different pressures. The refrigeration necessary for liquefaction is supplied to the air after it has been compressed and water-cooled to approximately room temperature, by indirect heat exchange with the effluent products of rectification. However, an additional amount of refrigeration must be supplied to compensate for cold losses resulting from the difference in enthalpy between the incoming air and the outgoing products of rectification and for heat leaks into the system. Methods of supplying this refrigeration heretofore used, involve compressing at least a portion of the incoming air to pressures as high as 3000 pounds and expanding with or without the performance of work to produce a temperature drop; or compressing all the incoming air to about 600 pounds and after the air has been partially cooled by the products of rectification expanding a portion of the air. These methods are wasteful from the standpoint of compressor energy and require a great deal of equipment in the form of extra compressors, intercoolers and expanders.

For economical operation it is essential to recover the cold content of the outgoing products of rectification. This is usually accomplished by passing these products in heat transfer relationship with the incoming air. In older systems in order to avoid deposition of frost and solid carbon dioxide in the tubular countercurrent heat exchangers through which the air is passed in indirect heat exchange relation with the outgoing products of rectification, the air is treated in driers and caustic scrubbers to remove water and carbon dioxide prior to admittance of the air into the heat exchangers. Even with this treatment the exchangers had to be thawed out regularly to remove the frost (which term is used in a generic sense to include both snow and ice) which caused stopping up of the apparatus.

More recently it has been suggested to use cold accumulators or regenerators (hereinafter referred to as heat exchangers) of large cold absorbing capacity through which the warm incoming air and the cold products of rectification are alternately passed with periodically reversed operation so that streams of warm air are flowed through the same packing filled spaces that the cold separated oxygen and nitrogen traversed during the previous step in the process, the high boiling impurities deposited in these spaces during the passage of air therethrough being removed by sublimation during the subsequent flow in a reverse direction of the products of rectification. The use of these reversing heat exchangers in a process in which the air is compressed to relatively high pressure results in more costly operation from the standpoint of horsepower requirements because upon every reversal, which may take place every three minutes, the volume of compressed air in the heat exchangers is lost and must be again replaced.

In copending application Serial No. 632,858 filed December 5, 1945, *now U. S. Patent No. 2,552,557*, there is disclosed and claimed a process for producing oxygen by liquefaction and rectification of air involving the flow of air at about 70 to about 85 pounds at a temperature of about 70° to about 110° F. through the heat exchange paths of two or more reversing heat exchangers in series, each exchanger containing two other paths through which are passed respectively streams of oxygen and nitrogen products of rectification in heat exchange relation with the air passing therethrough. The air stream flowing from the first exchanger to the second is refrigerated, the amount of cold thus introduced into the process being adequate to compensate for cold losses resulting from the difference in enthalpy between the air introduced into and the products of rectification withdrawn from the process and for heat leaks into the system. The temperature conditions in the first exchanger are such that substantially all moisture present in the air is removed therefrom in the form of frost. The temperature conditions in the second exchanger are such as to effect substantially complete removal of carbon dioxide from the air in its passage therethrough.

At the colder end of the second exchanger where the oxygen and nitrogen products of rectification enter and air leaves the exchanger, there is maintained between these products of rectification and the countercurrent stream of air a temperature difference in the range of about 5° to about 10° F., preferably about 6° to about 8° F. This temperature difference is the difference between the temperature of the air and the weighted average temperature of the products of rectification, all temperatures being taken at the colder end of the second exchanger. For the purposes of this invention, the weighted average temperature of the products of rectification is calculated by multiplying the temperature of the oxygen product stream by the volume percentage of the stream based on the combined volume of the products of rectification and adding thereto the corresponding figure obtained by multiplying the temperature of the nitrogen product stream by its volume percentage. Thus, for example, if the rectification system is operated to produce two streams of substantially pure oxygen and pure nitrogen, the weighted average temperature of the two streams would be approximately the sum of 20% of the oxygen stream temperature and 80% of the nitrogen stream temperature. Periodically the flow of air and nitrogen through their respective paths in the two exchangers is reversed so that upon reversal the air flows through the paths in the two exchangers through which during the preceding step the nitrogen had passed and the nitrogen flows through the paths in the two exchangers through which had previously passed the air. The nitrogen removes, by sublimation, the carbon dioxide deposited during the preceding step in the second exchanger and the frost deposited during the preceding step in the first exchanger.

Operating in this manner complete purging of carbon dioxide is attained upon each reversal of flow. Likewise complete purging of frost is obtained so that the equipment may be operated continuously.

This invention is in the nature of an improvement on the invention disclosed and claimed in the aforesaid copending application. It is an object of this invention to effect removal of incondensibles, such as hydrogen, helium and neon, from the rectification system without reduction in the yield of oxygen recovered in the process. A further object is to increase the efficiency of the operation of the rectification system. Other objects and advantages of this invention will be apparent from the following detailed description.

In accordance with this invention a stream of air is passed through a path in two zones in series, each of the zones containing at least three paths in heat exchange relation with each other and streams of oxygen and nitrogen rectification products are passed through the other two paths in these zones in heat exchange relation with the air passing therethrough. One of the streams is cooled in its flow between the first and second zones to a temperature sufficient to supply to the system the necessary cold to compensate for cold losses resulting from the difference in enthalpy between the incoming air and the outgoing products of rectification and for heat leaks into the system. The temperature difference between the temperature of the air leaving and the temperature of the rectification products entering the second zone is maintained within the range of from about 5° to about 10° F. and the exit temperature of the air leaving this zone is such as to effect substantially complete removal of carbon dioxide from the air in its passage through its path in this zone. From this second zone the air is passed to the high-pressure stage of a two-stage rectification system in indirect heat exchange relation with rectification products from the low-pressure stage of the system. A minor portion of the nitrogen introduced into the process and containing incondensible gases is withdrawn from the high-pressure stage, expanded to cool the same and the cold thus produced imparted to the rectification products entering the low-pressure stage and preferably also to the air entering the high-pressure stage. Periodically the flow of air and nitrogen is reversed through their respective paths in the two zones, the air upon reversal flowing through the paths through which had previously flowed the nitrogen and the nitrogen flowing through the paths through which had previously flowed the air, whereby upon each reversal the nitrogen substantially completely removes the carbon dioxide deposited in the second zone during the preceding step of the process.

In the preferred embodiment of the invention, a minor portion of the nitrogen withdrawn from the high-pressure stage of the rectification system is passed through the second zone where the nitrogen is heated by the air stream flowing to the high-pressure stage of the rectification system. The heated nitrogen is then mixed with the remainder of the nitrogen withdrawn from the high-pressure stage of the rectification system thereby increasing the temperature of the nitrogen, preferably not more than 20° F., and the mixed nitrogen stream thus introduced into the expander at a temperature such that no liquid nitrogen is formed within the expander with consequent improvement in the efficiency of the operation of the expander.

In the preferred embodiment illustrated in the drawing, the single figure of which illustrates diagrammatically a preferred layout of apparatus for practicing the process of this invention, the equipment shown for the practice of the process involves a pair of heat exchangers having an ethylene refrigeration system for refrigerating the air and the present description will be confined to the present illustrated embodiment of the invention. It will be understood, however, that the process may be carried out in other equipment, for example, each of the two exchangers in series may be replaced by two or more smaller exchangers placed in series and/or parallel, if desired, although this is objectionable from the standpoint of increasing construction costs, or the number of heat exchange paths in each exchanger may be increased over the 3-path construction shown in the drawing, or other refrigeration systems may be employed in lieu of the ethylene system. Hence, the scope of the invention is not confined to the embodiment herein described.

In the drawing reference character 10 indicates a heat exchanger which may be of any well-known type. In the embodiment shown in the drawings it consists of a single shell in which are provided three paths, namely, interior path 11 through which flows in one and the same direction throughout the operation of the exchanger the oxygen product of rectification. Paths 12 and 13 are provided within the shell of the exchanger through which periodically flow air and the nitrogen product of rectification in heat exchange relation with each other and with the oxygen. The heat exchanger has in each of the paths suitable fins of heat-conducting material, e. g., copper, promoting rapid and efficient heat exchange between the gaseous media flowing therethrough. As the construction of the heat exchanger per se does not form part of this invention and as it may be of any well-known type, it is believed further description thereof is unnecessary.

The flow of the air and nitrogen through their respective paths is periodically reversed so that during one step of the process air flows through path 12 and nitrogen through path 13, and upon reversal, during the succeeding step air flows through path 13 and nitrogen through path 12.

Reversal of flow is accomplished by suitably positioning the compound reversing valves 14 and 15 which may be of any well-known type. Valve 14 is disposed in the pipe line system consisting of air inlet pipe 16 leading into valve 14, and pipe lines 17 and 18 leading from the valve to cooling paths 12 and 13, respectively. At the base of the heat exchanger 10 lines 19 and 20 are positioned leading from paths 12 and 13, respectively, to the valve 15.

A second heat exchanger 21 is provided in the form of a shell having therein paths 22, 23 and 24 provided with fins to promote heat exchange as in the case of the exchanger 10. Path 24 is the path through which the oxygen product of rectification flows from the rectification system hereinafter described to a pipe line 25 which communicates with path 11 of heat exchanger 10. The base portions of paths 22 and 23 of heat exchanger 21 communicate with pipe lines 26 and 27, respectively, which are communicably connected with a compound valve 28 which may be of the same type as valves 14 and 15. At the upper portions paths 22 and 23 communicate respectively with lines 29 and 30 which in turn communicate with a compound reversing valve 31 which may be of the same type as the other reversing valves.

Reversing exchangers 10 and 21 may be placed in vertical, horizontal or any other desired position. Likewise, when these exchangers are arranged vertically, the colder end may be above or below the warmer end.

A refrigeration system 32 of any well-known construction for supplying a refrigerating medium, such as ethylene or carbon tetrafluoride is provided for cooling either the nitrogen flowing from heat exchanger 21 to heat exchanger 10, or the air flowing from heat exchanger 10 to heat exchanger 21. This refrigerating system operates to cause the flow of the refrigerating medium in indirect heat exchange relation with the nitrogen or air to be cooled, the rate of flow and temperature of the various media being so controlled that enough cold is introduced by refrigeration, at this point in the process, to compensate for cold losses resulting from the difference in enthalpy between the incoming air and the outgoing products of rectification and for heat leaks into the system. In the preferred embodiment of the invention the air leaving the heat exchanger 10 is refrigerated to cause a drop of about 5° to about 10° F. in its temperature; this has been found adequate for the purposes above stated. Refrigeration of the air is accomplished by causing it to flow through pipe line 33 which passes through the refrigerator 32 in indirect heat exchange with the refrigerant and communicably connects valves 15 and 28. Line 9 is the nitrogen line between the two heat exchangers 10 and 21.

Instead of refrigerating the nitrogen flowing from heat exchanger 21 to heat exchanger 10 thereby introducing the cold supplied by the refrigerating medium into the exchanger 10, or instead of refrigerating the air flowing from heat exchanger 10 to heat exchanger 21, the desired amount of refrigeration may be introduced into the system by expanding a portion of the air, say about 7% of the total air introduced into the system. The cold expanded air thus produced may be introduced into the nitrogen stream entering the heat exchanger 10 thereby supplying the necessary cold to compensate for cold losses resulting from the difference in enthalpy between the incoming air and the outgoing products of rectification and for heat leaks into the system. This latter method has the disadvantage that it involves a loss of approximately 7% of the oxygen content of the air introduced into the system. On the other hand it has the advantage that it eliminates the necessity for using a refrigeration system for cooling either the nitrogen or air, which system is more cumbersome and expensive in construction and operation than an expander of the type suitable for expanding a relatively small amount of air at a relatively low pressure, e. g., 70–85 pounds gauge.

With the arrangement of valves and piping shown flow of nitrogen and air through heat exchangers 10 and 21 may be periodically reversed, say every three minutes, so that during an initial period of operation air flows through heat exchange path 12, through line 19, valve 15, refrigeration system 32 by way of line 33, valve 28, line 26, cooling path 22 in heat exchanger 21, pipe line 29, valve 31 and thence to line 34 leading through the non-reversing heat exchanger 35 to the rectification system hereinafter described. At the same time, nitrogen flows through pipe line 36 leading from the non-reversing heat exchanger 35 into valve 31, line 30, through path 23 in heat exchanger 21, through line 27, valve 28, line 9, valve 15, pipe line 20, path 13 in heat exchanger 10, leaving this path through pipe line 18 and passing through valve 14 to the atmosphere or other suitable disposal point. Upon reversal (as shown by dotted arrows and valve settings), the air flows through valve 14, line 18, path 13, pipe line 20, valve 15, refrigeration system 32 by way of line 33, valve 28, pipe line 27, and thence through the cooling path 23, leaving this cooling path through pipe line 30 and passing through valve 31 and pipe line 34 into the non-reversing exchanger 35. At the same time, the nitrogen flows from heat exchanger 35 through pipe line 36 into valve 31, thence through pipe line 29, path 22 in heat exchanger 21, pipe line 26, valve 28, line 9, valve 15, line 19 into path 12, thence through line 17 into valve 14 and thence to the atmosphere or other suitable disposal point.

The rectification system comprises a two-stage rectification column 37, the lower section 38 of which is operated at a pressure of about 72 pounds gauge and the upper section 39 of which is operated at a pressure of from about 4 pounds to about 10 pounds gauge, preferably at about 5 pounds gauge. This column as is customary is provided with rectification plates of the bubble-cap or other desired type. The lower section 38 of the column 37 communicates with a condenser 40 and has a liquid collecting shelf 41 disposed immediately below the condenser 40 for collecting liquid nitrogen. Pipe line 42 leads from this shelf 41 to a non-reversing heat exchanger 43 which in turn communicates through a pressure reducing valve 44 with the top portion of the upper section 39 as indicated by the reference character 45. Condenser 40 acts as a reboiler for the upper section 39 of the column 37.

From the base portion of the lower section 38 a pipe line 46 for the flow of crude oxygen (containing approximately 40% oxygen) passes to a non-reversing heat exchanger 47 which communicates with pipe line 48 having a pressure reducing valve 49 therein with the low pressure section 39 at an intermediate point indicated by the reference character 50. Line 51 leads from the top of the condenser 40 and has a regulating valve 52 therein. This line communicates with an expander 53 which discharges by way of line 53a into line 54 hereinafter described. Preferably, there is also provided a branch line 58 having a regulating valve 59 and leading to a path 60 disposed in heat exchanger 21 in indirect heat exchange relation with the oxygen, nitrogen and air passing through the other three paths in this exchanger 21. A line 61 leads from path 60 back to line 51. Regulating valves 52 and 59 disposed in lines 51 and 58, respectively, regulate the portions of the nitrogen stream flowing from the condenser 40 which are passed directly to expander 53 and indirectly through path 60 of exchanger 21.

By the arrangement of lines hereinabove described a minor portion of the total nitrogen introduced into the process passes through line 51 and, preferably, of the portion thus withdrawn a minor portion, say about 10%, passes through line 58, path 60 and line 61 entering line 51 where it mixes with the remainder of the nitrogen withdrawn from the condenser 40. The portion of nitrogen passing through path 60 is warmed up by indirect heat exchange, and by mixing with the remainder of the nitrogen, the stream entering expander 53 is at a temperature sufficient to avoid condensation or formation of liquid nitrogen in the expander. In a preferred embodiment of the invention from about 1% to about 15% by volume of the total nitrogen introduced into the process and containing incondensibles, such as hydrogen, helium and neon, is passed through line 51 and of this quantity about 10% by volume passes through heating path 60 and 90% by volume continues through line 51.

The nitrogen stream refrigerated as a result of the expansion flows from the expander 53 to a line 53a which meets line 54 conveying the nitrogen stream leaving the top of low-pressure section 39. The mixture then flows through heat exchanger 43 in indirect heat exchange relation with the nitrogen passing through this exchanger and thereafter flowing through reducing valve 44 into the top of low-pressure section 39. From heat exchanger 43 the mixed nitrogen stream flows through line 55 into and through heat exchanger 47 where it flows in indirect heat exchange relation with the crude oxygen flowing therethrough to low-pressure section 39. From the heat exchanger 47 the mixed nitrogen stream passes through line 56 into and through heat exchanger 35 where it passes in indirect heat exchange relation with air flowing into and from this exchanger by way of line 34. From the heat exchanger 35 the nitrogen stream flows through line 36 into a compound valve 31, thence through path 22 or 23, as the case may be, of heat exchanger 21, through valves 28 and 15 connected by line 9, then through path 12 or 13 of heat exchanger 10 and finally through compound valve 14 to the atmosphere; the flow through path 12 or 13 of heat exchanger 10 depending upon the setting of valves 14 and 15 and the flow through path 22 or 23 of heat exchanger 21 depending upon the setting of valves 28 and 31 as hereinabove described in connection with the operation of these reversing heat exchangers.

The heat exchangers 35, 43 and 47 and the two-stage fractionating column 37 may be of any conventional type. Two separate fractionating columns, suitably interconnected may be used in place of the two-stage column 37 shown. It will be understood that the equipment throughout is heat insulated to minimize loss of cold.

One example of the operation of the process of this invention is described below. It will be understood this example is given for purposes of exemplification only and the invention is not limited thereto.

Air under pressure of about 75 pounds gauge and temperature of about 100° F. is supplied through line 16, valve 14 and line 17 to heat exchanger 10, flowing through path 12 in which it is cooled to a temperature of −134.5° F. The air then flows in indirect heat exchange relation with ethylene in the refrigeration system 32 and is cooled thereby to a temperature of −142° F., then passes through path 22 of the heat exchanger 21 leaving this path at a temperature of −275° F. *which is close to the condensation point of the air at the pressure prevailing in heat exchanger 21.* Substantially all moisture is removed in the form of frost in path 12 of heat exchanger 10 and all carbon dioxide is removed in solidified form in path 22 of heat exchanger 21. The air then flows through the heat exchanger 35 in heat exchange relation with nitrogen enters high-pressure column 38 at a temperature of −278° F. and a pressure of 72 pounds.

Crude oxygen at a temperature of −280° F. and a pressure of 72 pounds leaves the base of column 38, flows through heat exchanger 47 where its temperature is reduced to −289° F. and upon flow through the pressure reducing valve 49 is flashed, entering low-pressure column 39 at a temperature of −310° to −315° F. and a pressure of 5 pounds. Pure oxygen is withdrawn through line 57 at a temperature of −292.5° F. and a pressure of 5 pounds and flows through path 24, its temperature being increased to −146° F., the oxygen at this temperature entering path 11 of heat exchanger 10 and being withdrawn from this path at a temperature of 90° F. and at a pressure of 1 pound.

Nitrogen at a temperature of about −286.5° F. and a pressure of 72 pounds in amount equal to 12.5% by volume of the total nitrogen introduced into the process is withdrawn through line 51. Of the nitrogen flowing through line 51, 10% passes through line 58 and path 60, its temperature being increased to −146° F. The remaining 90% of the nitrogen flows through valve 52 in line 51 and is mixed with the other 10% nitrogen, the temperature of the mixture being about −277° F. The nitrogen stream leaving the expander 53 is at a pressure of 5 pounds and a temperature of −315° F. The expanded nitrogen flows through line 53a and becomes mixed with nitrogen at a temperature of −315.5° F. and a pressure of 5 pounds flowing through line 54. The resultant nitrogen stream passes through exchanger 43 in indirect heat exchange relation with nitrogen employed as reflux in column 39, its temperature being thereby increased to −306° F. while the temperature of nitrogen flowing through line 42 (pressure of 72 pounds) and exchanger 43 is reduced to −300° F. This nitrogen by expansion through valve 44 has its pressure reduced to 5 pounds and its temperature to −315.5° F. The nitrogen product of rectification then flows through heat exchanger 47 where its temperature is increased to −293° F. The crude oxygen stream flowing through exchanger 47 is thereby cooled from a temperature of −280° F. to a temperautre of −289° F. The nitrogen then flows through exchanger 35 in heat exchange relation with the air, the nitrogen stream temperature being thereby increased to −279° F. at which temperature it enters the heat exchanger 21, flows therethrough and is thereby heated to −146° F. At the colder end of the heat exchanger 21, the nitrogen and the oxygen streams have a weighted average temperature of nearly −282° F. while at this point the air is at a temperature of −275° F. A temperature difference of about 7° F. is therefore maintained. It will be noted that at the point where the air enters and the oxygen and nitrogen leave the heat exchanger 21 the difference in temperature is approximately 4° F., the air being at a temperature of −142° F. and the oxygen and nitrogen at −146° F.

From heat exchanger 21 the nitrogen flows through heat exchanger 10 where it is heated to 90° F. The nitrogen at this temperature and a pressure slightly above atmospheric, say 1 pound gauge, may be vented to the atmosphere thereby venting the incondensibles, such as hydrogen, helium and neon, removed from the high-pressure stage of the rectification system.

The desired oxygen product is withdrawn through line 57 at a temperature of −292.5° F. and pressure of 5 pounds, flows through heat exchanger 21 where its temperature is increased to −146° F. and then through heat exchanger 10 where its temperature is increased to 90° F. The oxygen leaves exchanger 10 at a pressure of 1 pound.

Upon reversal (as shown by dotted arrows and valve settings), which may take place every three minutes, the air flows through paths 13 and 23, respectively, of heat exchangers 10 and 21 and nitrogen flows through paths 12 and 22, respectively, of heat exchangers 10 and 21. The flow is otherwise substantially the same and the temperature and pressure conditions remain the same. The nitrogen in its flow through path 22 of heat exchanger 21 removes by sublimation the carbon dioxide deposited in this path by the air during the preceding step. Likewise, the nitrogen in its flow through path 12 of heat exchanger 10 removes from this path the frost deposited therein from the air during the preceding step. Thus in the continued operation upon each reversal the nitrogen effects removal of the carbon dioxide and frost deposited in the paths through which the air had passed during the preceding step of the process.

Operating in accordance with this invention it is found possible to recover substantially 100% of the oxygen content introduced into the rectification system in the form of substantially pure oxygen and at the same time effect continuous purging from the high-pressure stage of the rectification system of the incondensible constituents, such as hydrogen, helium and neon. Further, the purging is carried out so as to increase the efficiency of the rectification system in that the nitrogen stream containing the incondensibles is expanded and the refrigeration thus produced employed to cool the reflux oxygen and nitrogen introduced into the low-pressure stage and the air introduced into the high-pressure stage.

The expressions "reversing the flow of air and nitrogen" and "reversal" are used herein in the sense commonly employed in this art, namely, to mean the switching of the flow of two streams, for example, the air and the nitrogen streams, so that upon each "reversal" the air flows through the path through which had previously flowed the nitrogen, and the nitrogen flows through the path through which had previously flowed the air.

It will be noted this invention provides a process for producing oxygen of high purity without the use of chemical agents, which process may be operated continuously over a long period of time without shut-downs for the purpose of removing solid carbon dioxide or frost, which process is economical to operate, particularly in that the refrigeration which must be supplied to compensate for cold losses resulting from the difference in enthalpy between incoming air and the outgoing products of rectification and for heat leaks into the system is supplied at a point in the process where the temperatures are relatively high so that it can be supplied efficiently and economically, and which process effects continuous purging from the high-pressure stage of the rectification system of the incondensible constituents, such as hydrogen, helium and neon, so as to increase the efficiency of the rectification system.

Since certain changes may be made in carrying out the above process without departing from the scope of the invention, it is intended that all matter contained in the above description shall be interpreted as illustrative and not in a limiting sense.

What is claimed is:

1. A process for producing oxyygen by the liquefaction and rectification of air, which comprises passing a stream of air through a path in two zones in series, each of said zones containing at least three paths in heat exchange relation with each other, passing respectively streams of oxygen and nitrogen products of rectification through two other paths in said zones in heat exchange relation with the air passing therethrough, cooling at least one of said streams during its flow between the first zone and the second zone, withdrawing the air from the second zone at a temperature such that substantially all carbon dioxide in said air has been removed from the air in its passage through its path in said second zone, maintaining the temperature difference between the temperature of the air leaving and the weighted average temperature of the nitrogen and oxygen entering said second zone so that it falls within the range of from about 5° to about 10° F., passing the air from said second zone to the high-pressure stage of a two-stage rectification system in indirect heat exchange relation with a rectification product from the low-pressure stage of said system, withdrawing a minor portion of the nitrogen from the high-pressure stage, expanding the nitrogen thus withdrawn to cool the same, imparting the cold thus produced to the rectification products entering the low-pressure stage, periodically reversing the flow of air and nitrogen through their respective paths in said zones, the air upon reversal flowing through the paths through which had previously flowed the nitrogen and the nitrogen flowing through the paths through which had previously flowed the air, whereby upon each reversal the nitrogen substantially completely removes the carbon dioxide deposited in said second zone during the preceding step of the process.

2. A process for producing oxygen by the liquefaction and rectification of air, which comprises passing a stream of air at about 70 pounds to about 85 pounds gauge and a temperature of about 70° to about 110° F. through a path in two zones in series, each of said zones containing at least three paths in heat exchange relation with each other, passing respectively streams of oxygen and nitrogen products of rectification through two other paths in said zones in heat exchange relation with the air passing therethrough, cooling at least one of said streams during its flow between the first zone and the second zone, the amount of cold thus introduced into the process being adequate to compensate for cold losses resulting from the difference in enthalpy between the air introduced into and the products of rectification withdrawn from the process and for heat leaks into the system, withdrawing the air from the second zone at a temperature such that substantially all carbon dioxide in said air has been removed from the air in its passage through its path in said second zone, maintaining the temperature difference between the temperature of the air leaving and the weighted average temperature of the nitrogen and oxygen entering said second zone so that it falls within the range of from about 5° to about 10° F., passing the air from said second zone to the high-pressure stage of a two-stage rectification system in indirect heat exchange relation with a rectification product from the low-pressure stage of said system, withdrawing a minor portion of the nitrogen containing incondensible gases from the high-pressure stage, expanding the nitrogen thus withdrawn to cool the same, passing the expanded nitrogen in heat exchange relation with nitrogen and oxygen supplied as reflux to the low-pressure stage and with air supplied to the high-pressure stage, and periodically reversing the flow of air and nitrogen through their respective paths in said zones, the air upon reversal flowing through the paths in the two zones through which had previously flowed the nitrogen and the nitrogen flowing through the paths through which had previously flowed the air, whereby upon each reversal the nitrogen substantially completely removes the carbon dioxide deposited in the second zone during the preceding step of the process.

3. A process for producing oxygen by the liquefaction and rectification of air, which comprises passing a stream of air at about 70 pounds to about 85 pounds gauge and a temperature of about 70° to about 110° F. through a path in two zones in series, each of said zones containing three paths in heat exchange relation with each other, passing respectively streams of oxygen and nitrogen products of rectification through the two other paths in said zones in heat exchange relation with the air passing therethrough, cooling at least one of said streams during its flow from one zone to the other, the amount of cold thus introduced into the process being adequate to compensate for cold losses resulting from the difference in enthalpy between the air introduced into and the products of rectification withdrawn from the process and for heat leaks into the system, withdrawing the air from the second zone at a temperature such that substantially all carbon dioxide in said air has been removed from the air in its passage through its path in said second zone, maintaining the temperature difference between the temperature of the air leaving and the weighted average temperature of the nitrogen and oxygen entering said second zone so that it falls within the range of from about 5° to about 10° F., passing the air from said zones to the high-pressure stage of a two-stage rectification system in indirect heat exchange relation with a rectification product from the low-pressure stage of said system, withdrawing from the high-pressure stage about 1% to 15% of the total nitrogen introduced into the process, said nitrogen containing incondensible gases, heating approximately 10% of the nitrogen thus withdrawn, mixing the heated nitrogen with the remaining 90% of the nitrogen thus withdrawn thereby yielding a nitrogen stream having a temperature sufficiently high to avoid the formation of liquid nitrogen in the expander, expanding said nitrogen stream, passing the expanded nitrogen in heat exchange relation with oxygen and nitrogen supplied as reflux to the low-pressure stage and with the air supplied to the high-pressure stage, and periodically reversing the flow of air and nitrogen through their respective paths in said two zones, the air upon reversal flowing through the paths in the two zones through which had previously flowed the nitrogen and the nitrogen flowing through the paths in the said two zones through which had previously flowed the air, whereby upon each reversal the nitrogen substantially completely removes the carbon dioxide deposited in the second zone during the preceding step of the process.

4. A process for producing oxygen by the liquefaction and rectification of air, which comprises passing air at about 70 to about 85 pounds gauge and a temperature of about 70° to about 110° F. through a path in a zone containing three paths in heat exchange relation with each other, flowing oxygen and nitrogen products of rectification respectively through the other two paths in said zone in heat exchange relation with the air, the air thus being cooled to a temperature sufficiently low to deposit out as frost substantially all the moisture in the air, refrigerating the air leaving the first zone to lower its temperature about 5° to 10° F., then further cooling the air by flowing it through a path in a second zone containing three paths, flowing oxygen and nitrogen products of rectification respectively through the other two paths in said second zone in heat exchange relation with the air thereby cooling the air to a temperature sufficiently low to deposit out substantially all the carbon dioxide in the air, the differential between the temperature of the air and the weighted average temperature of the oxygen and nitrogen at the colder end of said second zone being within the range of about 5° to about 10° F., passing the air from said zones to the high-pressure stage of a two-stage rectification system in indirect heat exchange relation with a rectification product from the low-pressure stage of said system, withdrawing from 1% to 15% of the total nitrogen introduced into the process from the high-pressure stage of the system, said nitrogen containing incondensible gases, expanding the stream of nitrogen thus withdrawn, mixing the expanded nitrogen with a stream of nitrogen withdrawn from the low-pressure stage and passing the resultant nitrogen in heat exchange relation with nitrogen and oxygen fed to the low-pressure stage and air fed to the high-pressure stage, and periodically reversing the flow of air and nitrogen through their respective paths in the said two zones, the air upon reversal flowing through the paths in the two zones through which had previously flowed the nitrogen and the nitrogen flowing through the paths in the said two zones through which had previously flowed the air, whereby upon each reversal the nitrogen substantially completely removes the carbon dioxide deposited in the second mentioned zone and the frost deposited in the first mentioned zone during the preceding step in the process.

5. A process for producing oxygen by the liquefaction and rectification of air, which comprises passing a stream of air through a path in two zones in series, each of said zones containing three paths in heat exchange relation with each other, passing respectively streams of oxygen and nitrogen products of rectification through the two other paths in said zones in heat exchange relation with the air passing therethrough, thereby cooling the air leaving said second zone to a temperature sufficient to remove substantially all carbon dioxide therefrom, the carbon dioxide thus removed being deposited in said second zone, cooling at least one of said streams during its flow from one zone to the other, the amount of cold thus introduced into the process being adequate to compensate for cold losses resulting from the difference in enthalpy between the air introduced into and the products of rectification withdrawn from the process and for heat leaks into the system, passing the air from said second zone to the high-pressure stage of a two-stage rectification system, withdrawing from said high-pressure stage nitrogen containing incondensible gases, heating by indirect heat exchange with the air passing through said second zone the nitrogen thus withdrawn to a temperature sufficiently high to avoid the formation of liquid nitrogen upon expansion of said nitrogen, expanding said nitrogen, passing the expanded nitrogen in heat exchange relation with oxygen and nitrogen supplied as reflux to the low-pressure stage of said rectification system, and periodically reversing the flow of air and nitrogen though their respective paths in said two zones, the air upon reversal flowing through the paths in the two zones through which had previously flowed the nitrogen and the nitrogen flowing through the paths in the said two zones through which had previously flowed the air, whereby upon each reversal the nitrogen substantially completely removes the carbon dioxide deposited in the second zone during the preceding step of the process.

6. A process for producing oxygen by the liquefaction and rectification of air, which comprises passing a stream of air at about 70 pounds to about 85 pounds gauge and a temperature of about 70° to about 110° F. through a path in two zones in series, each of said zones containing three paths in heat exchange relation with each other, passing respectively streams of oxygen and nitrogen products of rectification through the two other paths in said zones in heat exchange relation with the air passing therethrough, thereby cooling the air leaving said second zone to a temperature sufficient to remove substantially all carbon dioxide therefrom, the carbon dioxide thus removed being deposited in said second zone, cooling at least one of said streams during its flow from one zone to the other, the amount of cold thus introduced into the process being adequate to compensate for cold losses resulting from the difference in enthalpy between the air introduced into and the products of rectification withdrawn from the process and for heat leaks into the system, passing the air from said second zone to the high-pressure stage of a two-stage rectification system in indirect heat exchange relation with a rectification product from the low-pressure stage of said system, withdrawing from the high-pressure stage from about 1% to about 15% of the total nitrogen introduced into the process, said nitrogen containing incondensible gases, heating a minor portion of the nitrogen thus withdrawn by indirect heat exchange with all of the air passing to the high-pressure stage of the rectification system, mixing the heated nitrogen with the remainder of the nitrogen thus withdrawn, thereby producing a nitrogen stream having a temperature sufficiently high to avoid the formation of liquid nitrogen upon expansion, expanding said nitrogen stream, passing the expanded nitrogen in heat exchange relation with oxygen and nitrogen supplied as reflux to the low-pressure stage and with the air supplied to the high-pressure stage, and periodically reversing the flow of air and nitrogen through their respective paths in said two zones, the air upon reversal flowing through the paths in the two zones through which had previously flowed the nitrogen and the nitrogen flowing through the paths in the said two zones through which had previously flowed the air, whereby upon each reversal the nitrogen substantially completely removes the carbon dioxide deposited in the second zone during the preceding step of the process.

*7. A process for producing oxygen by the liquefaction and rectification of air, which comprises passing a stream of rectification product through a path in a heat exchange zone, passing a stream of air through another path in said heat exchange zone to recover the cold content of the rectification product stream, thereby cooling the air to a temperature close to its condensation point at the pressure prevailing in said heat exchange zone and effecting substantially complete removal of carbon dioxide from the air in its passage through said heat exchange zone, passing the air from said heat exchange zone to the high-pressure stage of a two-stage rectification system, withdrawing from said high-pressure stage a gaseous stream rich in nitrogen, warming the gaseous stream thus withdrawn to a temperature such that upon expansion to produce refrigeration said gaseous stream is not liquefied by passing at least a portion of said gaseous stream through still another path in at least the colder end of said heat exchange zone in heat exchange relation with the streams of air and rectification product passing through said heat exchange zone, expanding the thus warmed gaseous stream to produce refrigeration without liquefaction of said gaseous stream, maintaining the temperature difference between the temperature of the air leaving and the temperature of the rectification product entering said heat exchange zone so that it falls within the range of from about 5° to about 10° F., and periodically reversing the flow of air and rectification product through their respective paths in said heat exchange zone, the air upon reversal flowing through the path through which had previously flowed the rectification product and the rectification product flowing through the path through which had previously flowed the air, whereby upon each reversal the rectification product substantially completely removes the carbon dioxide deposited in said heat exchange zone during the preceding step of the process.*

*8. A process for producing oxygen by the liquefaction and rectification of air, which comprises passing a stream of nitrogen rectification product through a path in a heat exchange zone, passing a stream of air through another path in said heat exchange zone to recover the cold content of the nitrogen rectification product stream, thereby cooling the air to a temperature close to*

*its condensation point at the pressure prevailing in said heat exchange zone and effecting substantially complete removal of carbon dioxide from the air in its passage through said heat exchange zone, passing the air from said heat exchange zone to the high-pressure stage of a two-stage rectification system, withdrawing from said high-pressure stage a gaseous stream rich in nitrogen, warming the gaseous stream thus withdrawn to a temperature such that upon expansion to produce refrigeration said gaseous stream is not liquefied by passing at least a portion of said gaseous stream through still another path in at least the colder end of said heat exchange zone in heat exchange relation with the streams of air and nitrogen rectification product passing through said heat exchange zone, expanding the thus warmed gaseous stream to produce refrigeration without liquefaction of said gaseous stream, passing the expanded gaseous stream in heat exchange relation with oxygen and nitrogen streams supplied as reflux to the low-pressure stage of said rectification system, maintaining the temperature difference between the temperature of the air leaving and the temperature of the nitrogen rectification product entering said heat exchange zone so that it falls within the range of from about 5° to about 10° F., and periodically reversing the flow of air and nitrogen rectification product through their respective paths in said heat exchange zone, the air upon reversal flowing through the path through which had previously flowed the nitrogen rectification product and the nitrogen rectification product flowing through the path through which had previously flowed the air, whereby upon each reversal the nitrogen rectification product substantially completely removes the carbon dioxide deposited in said heat exchange zone during the preceding step of the process.*

*9. A process for producing oxygen by the liquefaction and rectification of air, which comprises passing a stream of air through a path in a heat exchange zone containing four paths in heat exchange relation with each other, passing respectively streams of oxygen and nitrogen products of rectification through two of the other paths in said heat exchange zone in heat exchange relation with the air passing therethrough, withdrawing the air from said heat exchange zone at a temperature such that substantially all carbon dioxide in the air has been removed from the air in its passage through said heat exchange zone, passing the air from said heat exchange zone to the high-pressure stage of a two-stage rectification system, withdrawing a portion of the nitrogen product from said high-pressure stage and warming said portion to a temperature such that upon expansion to produce refrigeration said portion is not liquefied by passing at least a part of said portion through still another of said four paths in at least the colder end of said heat exchange zone in heat exchange relation with the streams of air and oxygen and nitrogen rectification products passing through said heat exchange zone, expanding the thus warmed portion to produce refrigeration without liquefaction of said portion, maintaining the temperature difference between the temperature of the air leaving and the weighted average temperature of the oxygen and nitrogen rectification products entering said heat exchange zone so that it falls within the range of from about 5° to about 10° F., and periodically reversing the flow of air and nitrogen rectification product through their respective paths in said heat exchange zone, the air upon reversal flowing through the path through which had previously flowed the nitrogen rectification product and the nitrogen rectification product flowing through the path through which had previously flowed the air, whereby upon each reversal the nitrogen rectification product substantially completely removes the carbon dioxide deposited in said heat exchange zone during the preceding step of the process.*

*10. The process of claim 9 wherein the air is withdrawn from said heat exchange zone at a temperature of the order of —275° F.*

*11. A process for producing oxygen by the liquefaction and rectification of air, which comprises passing a stream of air through a path in two heat exchange zones in series, each of said zones containing three paths in heat exchange relation with each other, passing respectively streams of oxygen and nitrogen products of rectification through the two other paths in said zones countercurrent to the air passing therethrough, thereby cooling the air leaving the second zone to a temperature sufficient to remove substantially all carbon dioxide therefrom, the carbon dioxide thus removed being deposited in said second zone, passing the air from said second zone to the high-pressure stage of a two-stage rectification system, withdrawing from said high-pressure stage nitrogen containing incondensible gases, warming the nitrogen thus withdrawn to a temperature such that upon expansion to produce refrigeration said nitrogen is not liquefied by passing at least a portion of said nitrogen through a fourth path in said second zone in heat exchange relation with the streams of air and oxygen and nitrogen rectification products passing through said second zone, expanding the thus warmed nitrogen to produce refrigeration without liquefaction of said nitrogen, passing the expanded nitrogen in heat exchange relation with oxygen and nitrogen streams supplied as reflux to the low-pressure stage of said rectification system, maintaining the temperature difference between the temperature of the air leaving and the weighted average temperature of the oxygen and nitrogen rectification products entering said second zone so that it falls within the range of from about 5° to about 10° F., and periodically reversing the flow of air and nitrogen rectification product through their respective paths in said zones, the air upon reversal flowing through the path in said zones through which had previously flowed the nitrogen rectification product and the nitrogen rectification product flowing through the path in said zones through which had previously flowed the air, whereby upon each reversal the nitrogen rectification product substantially completely removes the carbon dioxide deposited in said second zone during the preceding step of the process.*

*12. The process of claim 11 wherein the expanded nitrogen after passing in heat exchange relation with oxygen and nitrogen streams supplied as reflux to the low-pressure stage of said rectification system passes in heat exchange relation with the air passing from said second zone to the high-pressure stage of said rectification system.*

*13. A process for producing oxygen by the liquefaction and rectification of air, which comprises passing a stream of nitrogen rectification product through a path in a heat exchange zone, passing a stream of air through another path in said heat exchange zone to recover the cold content of the nitrogen rectification product stream,*

*thereby cooling the air to a temperature close to its condensation point at the pressure prevailing in said heat exchange zone and effecting substantially complete removal of carbon dioxide from the air in its passage through said heat exchange zone, passing the air from said heat exchange zone to the high-pressure stage of a two-stage rectification system, withdrawing from said high-pressure stage a gaseous stream rich in nitrogen, warming the gaseous stream thus withdrawn to a temperature such that upon expansion to produce refrigeration said gaseous stream is not liquefied by passing at least a portion of said gaseous stream through still another path in at least the colder end of said heat exchange zone in heat exchange relation with the streams of air and nitrogen rectification product passing through said heat exchange zone, expanding the thus warmed gaseous stream to produce refrigeration without liquefaction of said gaseous stream, and periodically reversing the flow of air and nitrogen rectification product through their respective paths in said heat exchange zone, the air upon reversal flowing through the path through which had previously flowed the nitrogen rectification product and the nitrogen rectification product*

*flowing through the path through which had previously flowed the air, whereby upon each reversal the nitrogen rectification product substantially completely removes the carbon dioxide deposited in said heat exchange zone during the preceding step of the process.*

FRANK J. JENNY.
EDWARD G. SCHEIBEL

REFERENCES CITED

The following references are of record in the file of this patent or the original patent:

UNITED STATES PATENTS

| Number | Name | Date |
|---|---|---|
| 1,539,450 | Wilkinson | May 26, 1925 |
| 1,607,322 | Van Nuys | Nov. 16, 1926 |
| 2,057,804 | Twomey | Oct. 20, 1936 |
| 2,422,626 | Koehler | June 17, 1947 |
| 2,460,859 | Trumpler | Feb. 8, 1949 |
| 2,503,939 | De Baufre | Apr. 11, 1950 |

FOREIGN PATENTS

| Number | Country | Date |
|---|---|---|
| 373,918 | Great Britain | June 2, 1932 |
| 469,943 | Great Britain | Aug. 3, 1937 |